United States Patent [19]

Palmer

[11] 4,030,713

[45] June 21, 1977

[54] VEHICLE SUSPENSION DEVICE

[75] Inventor: Dale A. Palmer, Monroe, Mich.

[73] Assignee: Monroe Auto Equipment Company, Monroe, Mich.

[22] Filed: Jan. 20, 1975

[21] Appl. No.: 542,618

[52] U.S. Cl. .................... 267/8 R; 267/34; 188/314

[51] Int. Cl.² ........................ F16F 13/00

[58] Field of Search ............ 267/8 A, 8 R, 34, 61, 267/177, 64 A, 64 R, 65 R, 65 A; 293/86, 85, 89; 188/322, 321, 317, 314, 318, 106; 213/43

[56] References Cited

UNITED STATES PATENTS

| | | | |
|---|---|---|---|
| 3,010,714 | 11/1961 | Stresnak et al. | 267/8 R |
| 3,043,581 | 7/1962 | Schmidt | 267/8 R |
| 3,163,411 | 12/1964 | Heckethorn | 267/8 R |
| 3,251,591 | 5/1966 | NcNally | 267/34 |
| 3,263,983 | 8/1966 | Bliven | 267/34 |
| 3,582,059 | 6/1971 | Van Ooy | 267/34 |
| 3,618,927 | 11/1971 | Nicholls | 267/34 |
| 3,788,433 | 1/1974 | Katsumori | 188/314 |
| 3,877,687 | 4/1975 | Sarti | 267/8 R |

*Primary Examiner*—James B. Marbert
*Attorney, Agent, or Firm*—Harness, Dickey & Pierce

[57] ABSTRACT

A vehicle suspension device comprising a telescopic shock absorber including an elongated tubular housing, a piston reciprocable within the housing and connected to one end of a piston rod extending axially outwardly from one end of the housing, a tubular dirt shield supported on one end of the piston rod and extending coaxially of the rod and the housing, a helical coil spring extending coaxially of the housing and the dirt shield with the dirt shield being disposed entirely within the confines of the coil spring, and first and second spring supports located on the dirt shield and the exterior of the housing for operatively supporting the coil spring in its proper position around the shock absorber.

7 Claims, 3 Drawing Figures

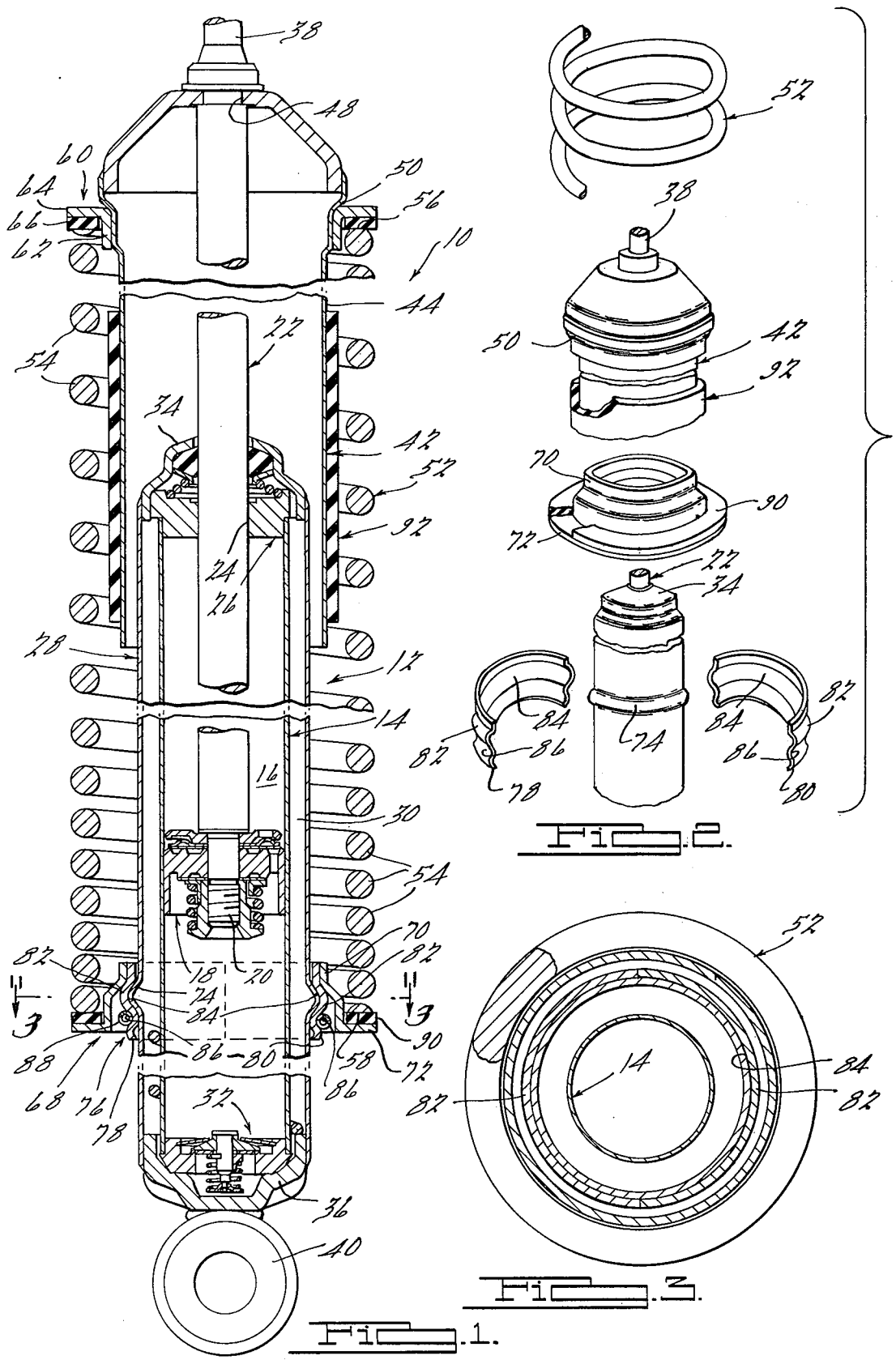

VEHICLE SUSPENSION DEVICE

SUMMARY OF THE INVENTION

This invention relates generally to vehicle suspension devices and more particularly, to a new and improved combination hydraulic shock absorber and coil spring arrangement for use in the suspension systems of automotive vehicles and the like.

It is accordingly a general object of the present invention to provide a new and improved suspension device for automotive vehicles and the like.

It is a more particular object of the present invention to provide a new and improved combination hydraulic shock absorber and coil spring arrangement which may be incorporated in the suspension systems of automotive vehicles.

It is still a more particular object of the present invention to provide a new and improved arrangement for operatively supporting and orienting a helical coil spring relative to the shock absorber dirt shield.

It is yet another object of the present invention to provide a new and improved vehicle suspension device, as above described, incorporating a novel means for attaching the coil spring upon the shock absorber housing.

It is another object of the present invention to provide a new and improved vehicle suspension device of the above-described type which is of a relatively simple design, is economical to commercially manufacture and which will have a long and effective operational life.

BRIEF DESCRIPTION OF THE DRAWING

FIG. 1 is a longitudinal cross-sectional view of the vehicle suspension device of the present invention;

FIG. 2 is an exploded assembly view of the dirt shield, coil spring and spring support flanges incorporated in the suspension device shown in FIG. 1, and FIG. 3 is a transverse cross-sectional view taken substantially along the line 3—3 of FIG. 1.

DETAILED DESCRIPTION OF A PREFERRED EMBODIMENT

Referring now in detail to the drawing, and in particular to FIG. 1 thereof, a vehicle suspension device 10, in accordance with one preferred embodiment of the invention, is shown as including a hydraulic direct acting telescopic shock absorber 12 comprising an elongated tubular pressure cylinder 14 that defines an internal working chamber 16. Disposed within the chamber 16 is a valved piston 18 which is fixedly secured to a reduced diameter end portion 20 of an elongated reciprocable piston rod 22 that extends axially upwardly from the upper end of the pressure cylinder 14 and is reciprocable concomitantly with the piston 18 in a manner well known in the art. The piston rod 22 has the upper end thereof extending through a central opening 24 in a combination rod guide and seal assembly, generally designated by the numeral 26, which functions to close the upper end of the chamber 16 and slidably and sealingly support the piston rod 22 for reciprocal movement relative thereto. Disposed around the outer periphery of the pressure cylinder 14 is a concentric tubular reserve tube or housing 28 which is coextensive of the pressure cylinder 14 and defines a fluid reservoir 30 therewith. The reservoir 30 is communicable with the chamber 16 via a base valve assembly, generally designated 32, which is located at the lower end of the pressure cylinder 14 and functions to selectively control the flow of fluid between the reservoir 30 and chamber 16. The upper and lower ends of the shock absorber 12 are closed by conventional end caps 34 and 36, which are operatively secured, as by welding or the like, to the opposite ends of the housing 28. Means in the form of suitable attachment fittings or the like 38 and 40 are provided on the outer or terminal end of the piston rod 22 and the end cap 36, respectively, for securing the suspension device 10 of the present invention to the sprung and unsprung portions of the associated vehicle in a manner well known in the art.

For purposes of conciseness of description, the piston 18 and base valve assembly 32 are of substantially the same construction and operation as the analogous components in U.S. Pat. No. 3,771,626, owned by the assignee of this application and the disclosure of which is incorporated by reference herein.

As best seen in FIG. 1, the suspension device 10 is provided with an elongated cylindrical dirt shield assembly, generally designated by the numeral 42 which includes a tubular dirt shield member 44 that is arranged concentrically of the upper end of the piston rod 22 and housing 28. The upper end of the dirt shield 44 is fixedly secured to the adjacent end of the piston rod 22 by means of a generally cup-shaped end cap 46 that is secured to the dirt shield member 44, as by welding or the like. The end cap 46 is formed with a central opening 48 through which the upper end of the piston rod 42 extends, with the upper fitting 38 being secured as by welding or the like to the upper side of the end cap 46. The upper end of the dirt shield member 44 is formed with a radially outwardly extending shoulder 50 which functions in a manner hereinafter to be described in operatively supporting an elongated helical coil spring 52 which is arranged concentrically of the shock absorber 12, as illustrated. The coil spring 52 is preferably of the variable rate type and as such, comprises varying members of spring convolutions 54 along the length thereof. In a preferred construction of the present invention, the greater number of convolutions 54 of the spring 52 are located in axial registry or alignment with the housing 28, i.e. at the lower end of the spring 52, in order to minimize abrasion between the inner periphery of the spring 52 and the dirt shield assembly 42 during operation of the suspension device 10. The spring 52 is provided with upper and lower terminal ends 56 and 58, respectively, the former of which is adapted to be supported by an upper spring support flange, generally designated by the numeral 60. The flange 60 includes a generally axially extending annular section 62 which terminates at the upper end thereof in an integral radially extending section 64. The inner diameter of the flange 60 is larger than the outer diameter of the dirt shield member 42 but is smaller in diameter than the shoulder 50 formed in the upper end thereof, whereby the flange 60 may be forced upwardly under the influence of the spring 52 and be fixedly retained in abutting engagement with the shoulder 50. As best seen in FIG. 1, a resilient bearing pad 66 is interposed between the radial section 64 of the flange 60 and the upper end 56 of the spring 52.

The lower end of the coil spring 52 is operatively supported by means of a lower spring support flange, generally designated 68 which is adapted to be secured to the outer periphery of the housing 28. The flange 68 is similar to the aforedescribed flange 60 and as such comprises a generally axially extending section 70 which terminates at the lower end thereof in a radially outwardly extending section 72. The flange 68 is supported at a position generally axially aligned with the radially outwardly extending shoulder 74 formed in the reserve tube 28. Interposed between the axial section 70 of the lower spring support flange 68 and the shoulder 74 is a spring support flange retainer assembly, generally designated by the numeral 76, and comprising a pair of semi-circular retainer members 78 and 80 as best seen in FIG. 2. The members 78, 80 extend approximately 180° around the housing 28 and are formed with an outwardly swaged portion 82 defining a radially inwardly confronting recess 84 adapted to nestingly receive the radially outwardly projecting shoulder 74 on the housing 28. Additionally, the retainer members 78, 80 are formed with a radially inwardly extending recess 86 around the outer periphery thereof which is adapted to operatively receive a suitable retaining or snap ring 88. It will be noted that the inner diameter of the axial section 70 of the spring support flange 68 is greater than the outer diameter of the shoulder 74 but is smaller in diameter than the outwardly formed swaged portion 82 on the retainer members 78, 80. Accordingly, upon assembly of the suspension device 10, the lower spring support flange 68 is moved axially of the housing 28 to a position above the shoulder 74. Thereafter, the two retainer members 78, 80 are positioned around the shoulder 74 and the snap ring 88 is placed therearound in order to operatively secure the members 78, 80 in place. The flange 68 may thereafter be moved downwardly until the axial section 70 thereof engages the swaged portion 82 of the members 78, 80, whereupon the flange 68 will be properly positioned along the housing 28. As illustrated, a suitable resilient bearing pad 90 is provided on the radial section 72 of the flange 68 and is adapted for engagement with the lower terminal end 58 of the spring 52. It will be noted that both of the flanges 60 and 68 are retained in their respective axial positions along the suspension device 10 under the influence of the coil spring 52 and as such the spring 52 is normally under a preselected compression load when it is installed on the device 10. In order to provide for sound insulation and guide means for the spring 52, an elongated annular sleeve 92, fabricated of extruded rubber or other suitable resilient material, is provided around the outer periphery of the dirt shield member 44, with the member 92 functioning to prevent interengagement of the spring 52 with the dirt shield member 44 and housing 28 during cyclic operation of the suspension device 10. It will be noted that by placing the spring 52 on the device 10 such that the greater concentration of spring convolutions 54 are located out of axial registry with the sleeve 92, a minimum amount of sleeve abrasion will occur during operation of the shock absorber 12.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A vehicle suspension device comprising,
   a telescopic shock absorber including an elongated tubular housing,
   a piston reciprocally disposed within said housing and connected to one end of a piston rod extending axially outwardly from one end of said housing,
   attachment means on the outer end of said piston rod and one end of said housing for securing said device to the sprung and upsprung portions of an associated vehicle,
   a tubular dirt shield supported on said one end of said piston rod and extending coaxially of said rod and said housing,
   said dirt shield being larger in diameter than said housing and adpated to telescopically receive the adjacent end of said housing therewithin,
   said dirt shield including a generally tubular-shaped dirt shield member and a cap secured to said piston rod and said dirt shield member, said dirt shield member being formed with a radially outwardly extending shoulder adapted to operatively support one of said spring support means,
   a helical coil spring extending coaxially of said housing and said dirt shield, with said dirt shield being disposed substantially entirely within said coil spring, and
   first and second spring support means for operatively supporting said spring on said shock absorber,
   one of said spring support means comprising an annular spring engaging member having an axially extending portion arranged coaxially of said shock absorber and a radially outwardly extending flange portion and adapted to have one axial end of said spring bear thereagainst, said one support means also comprising first and second circumferentially extending members disposed at least in part between the outer periphery of said shock absorber and the inner periphery of said axial portion of said spring engaging member, said circumferentially extending members each having radially outwardly projecting areas adapted to nestingly receive a radially outwardly projecting portion on said shock absorber and thereby at least in part support said annular member upon said shock absorber.

2. The invention as set forth in claim 1 which includes a second radially outwardly extending shoulder on said housing adapted to operatively support the other of said spring support means.

3. The invention as set forth in claim 1 wherein said first and second circumferentially extending members are resiliently urged into engagement with said projecting portion of said shock absorber by a coil spring.

4. The invention as set forth in claim 1 which includes an insulating sleeve extending around the outer periphery of said dirt shield, and wherein said coil spring is of the variable rate type and includes a greater number of convolutions at one axial portion thereof than at another axial portion thereof, and wherein said greater number of convolutions are spaced axially away from said dirt shield and said sleeve.

5. The invention as set forth in claim 1 wherein each of said circumferentially extending members extends approximately 180° around said shock absorber.

6. The invention as set forth in claim 1 wherein said one support means comprises the support means associated with said tubular housing.

7. The invention as set forth in claim 1 wherein the inner periphery of said annular portion of said spring engaging member is larger in diameter than the outer periphery of said outwardly projecting portion of said shock absorber and smaller in diameter than the outer periphery of said circumferentially extending members when said members are mounted upon said shock absorber.

* * * * *